(No Model.)

T. W. BROOKS.
COTTON CULTIVATOR.

No. 459,990. Patented Sept. 22, 1891.

Witnesses
A. J. Schwartz
C. S. Frye

Thomas W. Brooks
Inventor;
W. T. Fitzgerald & Co.,
Attorneys.

UNITED STATES PATENT OFFICE.

THOMAS W. BROOKS, OF SANTA, ALABAMA.

COTTON-CULTIVATOR.

SPECIFICATION forming part of Letters Patent No. 459,990, dated September 22, 1891.

Application filed May 28, 1891. Serial No. 394,343. (No model.)

*To all whom it may concern:*

Be it known that I, THOMAS W. BROOKS, a citizen of the United States, residing at Santa, in the county of Jackson and State of Alabama, have invented certain new and useful Improvements in Cotton-Cultivators; and I do hereby declare the following to be a full, clear, and exact description of the invention, such as will enable others skilled in the art to which it appertains to make and use the same.

My invention relates to cotton-cultivators; and it consists in a new and improved cultivator of this class which will cultivate two rows of cotton at the same time, thus saving one half of the labor now required to make a cotton crop, the cultivator being so light in construction that one horse can draw it all day; and the invention will be hereinafter fully described and claimed.

Figure 1:
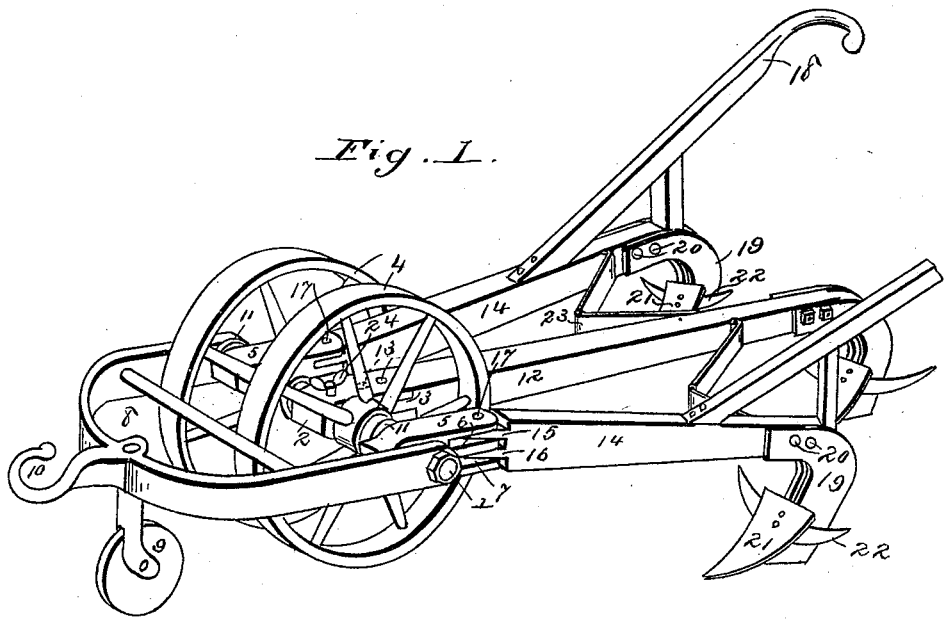
Figure 2:
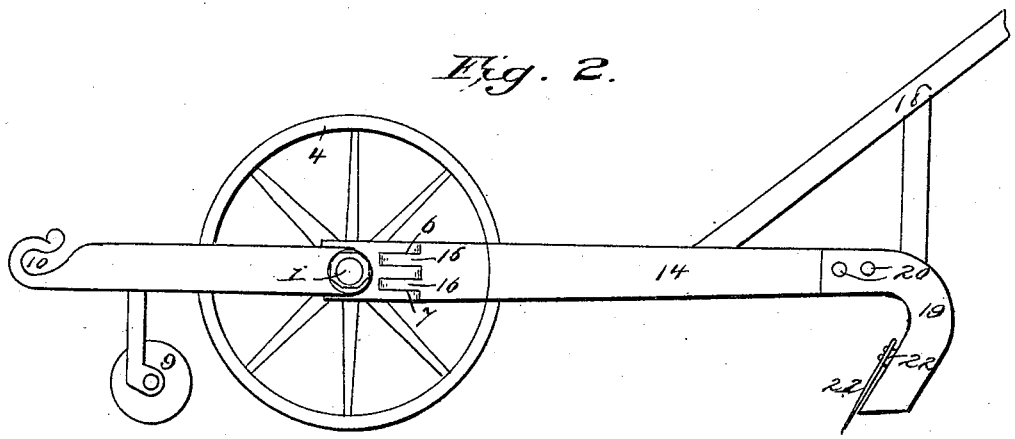
Figure 3:

Referring to the accompanying drawings, Figure 1 is a top perspective view of my new and improved cotton-cultivator. Fig. 2 is a side elevation of the same. Fig. 3 illustrates in detail one of the cultivator-blades.

Referring to the several parts by their designating numerals, 1 indicates the axle, which is usually two feet in length. Upon the center of this axle is mounted the central coupling-head 2, the extended rear end of which is formed with the horizontal slot 3. On each side of this central coupling-block is mounted a supporting-wheel 4, and on the ends of the axle, on the outer sides of the wheels 4, are mounted the two outer coupling-blocks 5 5, the extended rear ends of each of said blocks being formed with an upper and a lower horizontal slot 6 7, as most clearly shown in the side view, Fig. 2, of the drawings. Upon the outer ends of the axle are mounted the rear ends of a U-shaped frame 8, the forward end of which is supported on a caster-wheel 9, and is provided with the hook 10, to which the singletree of the horse is hitched. Washers 11 are preferably placed upon the axle between the central bearing-block and the supporting-wheels, between the supporting-wheels and the outer bearing-blocks, and between the outer bearing-blocks and the rear ends of the frame 8.

12 indicates the central beam, the forward shouldered end of which is secured in the horizontal slot 3 of the central coupling-block 2 by means of two vertical bolts 13. The side beams 14 are formed at their forward ends with the horizontal tongues 15 16, which fit in the upper and lower horizontal slots 6 7, formed in the rear ends of the outer coupling-blocks 5, and are there pivotally secured by the single vertical coupling-bolts 17. Upon the side beams 14 are secured and braced the handles 18.

To the rear ends of the three beams are secured, by the removable bolt 20, the curved standards 19, upon the lower ends of which are secured the cultivating-blades. These consist of the small shield-shaped blades 21, which are preferably no larger than a man's hand, and the curved sweeps 22, the central sweep being larger than those on the side standards. These blades are not intended for breaking the land in the first place, but are designed for the cultivation of the cotton from the time it is ready to be hoed.

In operation the horse walks between the two rows, the central blade working between the rows and the side blades on the outer sides of the same. The side beams are connected with the central beam by the double hinges 23, the hinge between each two beams consisting of two separate lengths or leaves, which are hinged together at their inner ends, and at their outer ends are hinged, respectively, to the outer beam and the inner beam. It will be seen that as the three coupling-blocks 2 5 5 can turn readily on the axle 1 the cultivator-beams can be readily lifted by the handles to raise them over obstructions, or to raise or lower them for any purpose for cultivating, and the connecting-hinges 23 cause the central beam to move up and down with the outer beams when the latter are raised or lowered by their handles, enabling all three to be raised together in turning at the ends of rows. By forming the forward ends of the side beams with the horizontal tongues, and forming the rear extended ends of the coupling-blocks 5 with the horizontal slots, in which the said tongues are pivoted on vertical pivot-bolts, it will be seen that the entire side beams can be readily swung or moved either to the right or left in cultivating, this construction also enabling me to turn readily and quickly at the end of a row. The small blades 21 and the small curved sweeps 22 afford a thorough and effective shallow cultivation, which is now generally deemed the best for cultivating cotton, and at the same time the draft on the horse is so light that one horse can readily pull the cultivator and can cultivate fifty acres of cotton in a day.

When it is desired to cultivate without breaking the ground in the middle of the rows, the blades on the middle beam can be readily removed by taking out the bolts 20, when, by tightening a thumb-screw 24 running down through the central coupling-block 2, the central beam will be held projecting out rigidly from the axle, and its rear end thus be prevented from dragging on the ground.

From the foregoing description, taken in connection with the accompanying drawings, the construction, operation, and advantages of my new and improved cotton-cultivator will be readily understood. It will be seen that this cultivator is light and strong in its construction, and is very convenient and effective in operation, enabling one man to perform twice the work in cultivating a cotton crop that is now possible, and enabling him to do it in a more effective manner.

Having thus described my invention, what I claim, and desire to secure by Letters Patent, is—

1. The combination of the round axle 1, the central coupling-block 2, movably mounted thereon, the supporting-wheels 4, mounted on the axle, the outer coupling-blocks 5, movably mounted on the ends of the axle and having their extended rear ends formed with the horizontal slots, the central beam provided with cultivator-blades and secured to the central block 2, and the side beams 14, having the handles secured upon them, provided with cultivator-blades connected with the central beam and formed at their forward ends with the horizontal tongues pivotally secured in the slots 6 7, substantially as set forth.

2. The combination of the round axle 1, the central coupling-block 2, movably mounted upon the same, the supporting-wheels mounted on the axle, the outer coupling-blocks 5, movably mounted on the ends of the axle and having the rear extensions formed with the horizontal slots 6 7, the central beam provided with the cultivator-blades and secured to the central coupling-block, the side beams, having the handles secured upon them, provided with the cultivator-blades and formed at their forward ends with the horizontal tongues which are pivotally secured in the horizontal slots, and the hinges 23, connecting the middle beam and the outer beams together, substantially as set forth.

3. The combination, with the round axle, of the end coupling-blocks movably mounted thereon, the central coupling-block movably mounted on the axle and having the retaining thumb-screw 24, and the central and side beams secured, respectively, to the central and outer coupling-blocks and provided with the cultivator-blades, substantially as set forth.

In testimony whereof I affix my signature in presence of two witnesses.

THOMAS W. BROOKS.

Witnesses:
T. D. STARNES,
W. D. PARKS.